United States Patent [19]
Meguro et al.

[11] 3,865,811
[45] Feb. 11, 1975

[54] 1,4-BENZODIAZEPINE DERIVATIVES

[75] Inventors: Kanji Meguro; Yutaka Kuwada, both of Hyogo, Japan

[73] Assignee: Takeda Chemical Industries, Ltd., Osaka, Japan

[22] Filed: Feb. 5, 1973

[21] Appl. No.: 329,411

Related U.S. Application Data
[62] Division of Ser. No. 90,422, Nov. 17, 1970, abandoned.

[30] Foreign Application Priority Data
Nov. 18, 1969 Japan.................... 44-92366

[52] U.S. Cl.... 260/239 BD, 260/308 R, 260/308 C, 424/244, 424/269
[51] Int. Cl............................................ C07d 53/06
[58] Field of Search............................ 260/239 BD

[56] References Cited
UNITED STATES PATENTS
3,646,055  2/1972  Hester.................... 260/308 R

*Primary Examiner*—Alton D. Rollins
*Attorney, Agent, or Firm*—Wenderoth, Lind & Ponack

[57] ABSTRACT

1-oxo- or 1-thioxo-s-triazolo [4,3-a][1,4] benzodiazepine derivatives of the corresponding 5N-oxides or tautomers thereof are prepared as follows:

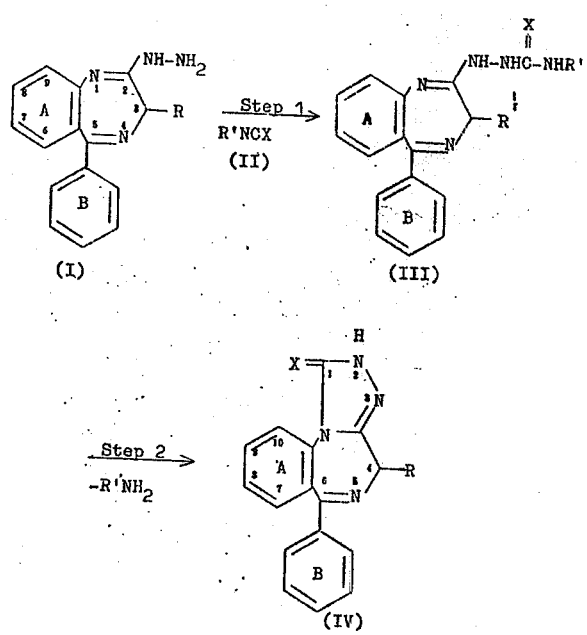

The compounds (III) and (IV) possess activity as central nervous system agents.

7 Claims, No Drawings

1,4-BENZODIAZEPINE DERIVATIVES

This is a division of application Ser. No. 90,422, filed Nov. 17, 1970, now abandoned.

This invention relates to a novel and useful 1-oxo- or 1-thioxo-s-triazolo[4,3-a][1,4]benzodiazepine derivative of the general formula.

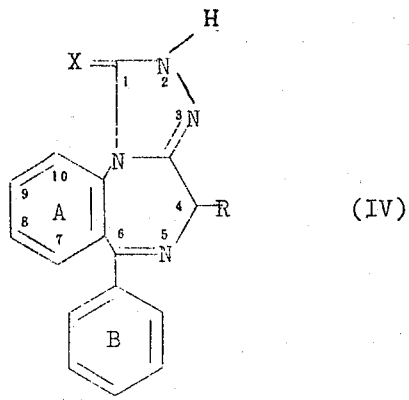

(IV)

wherein rings A and B independently are unsubstituted or substituted by one or more members of the group of halogen, nitro, trifluormethyl, alkyl or alkoxy, R is hydrogen or lower alkyl, X is oxygen or sulfur, as well as the corresponding 5N-oxides and tautomers thereof
and the pharmaceutically acceptable salts thereof.

This invention also relates to a novel and useful process for producing the benzodiazepine derivatives (IV).

Referring to the general formula (IV), both rings A and/or B are unsubstituted or substituted by one or more of the same or different members of the group of halogen (i.e., fluorine, chlorine, bromine, iodine), nitro, trifluoromethyl, alkyl or cycloalkyl of up to 6 carbon atoms (e.g., methyl, ethyl, propyl, isopropyl, butyl, sec.-butyl, tert.-butyl, pentyl, hexyl, cyclohexyl), and alkoxy of up to 4 carbon atoms (e.g., methoxy, ethoxy, propoxy, butoxy, sec.-butoxy, tert.-butoxy). The lower alkyl represented by R in formula (IV), is preferably of up to 6 carbon atoms (e.g. methyl, ethyl, propyl, isopropyl, butyl, sec.-butyl, tert.-butyl, amyl, hexyl).

1-Oxo- or 1-thioxo-s-triazolo[4,3-a][1,4]benzodiazepine derivatives (IV) can be produced by a series of the following reactions,

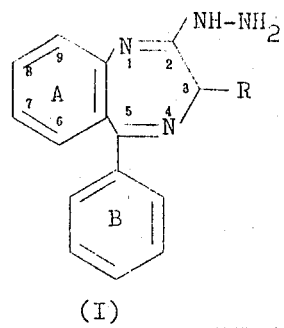

(I)

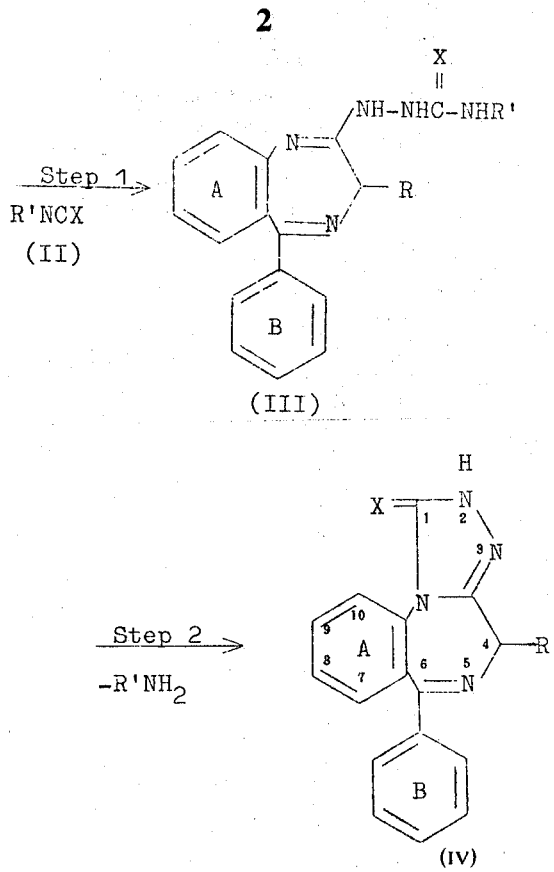

wherein rings A and B, R and X have the same meaning as hereinbefore defined, R' is hydrocarbon residue, and the nitrogen at the 4-position of formulae (I) and (III) and at the 5-position of formula (IV) is accompanied or unaccompanied with oxygen.

Referring to the general formulae (II) and (III) as the hydrocarbon residue represented by R', there are mentioned generally alkyl or cycloalkyl of up to 8 carbon atoms (e.g., methyl, ethyl, propyl, isopropyl, butyl, sec.-butyl, tert.-butyl, hexyl, cyclohexyl, octyl), aryl such as mono- or di- cyclic carbocyclic aryl (e.g., phenyl, naphthyl) and aralkyl such as phenyl lower alkyl (e.g., benzyl, phenethyl). The aromatic rings of the said aryl and aralkyl groups may be unsubstituted by one or more substituents which do not interfere with the reaction involved.

STEP 1

A compound (I) is reacted with isocyanic acid ester or isothiocyanic acid ester of the general formula (II). Generally, the reaction advantageously proceeds in the presence of a suitable solvent which may be, for example, aromatic hydrocarbons, pyridine, tetrahydrofuran, chloroform, dimethylformamide and alcohols (e.g., methanol, ethanol), at a room temperature or below room temperature. When occasion demands, the reaction may be carried out under heating. The amount of the compound (II) to be employed usually ranges from 1 to 1.5 mole equivalent to 1 mole of the compound (I). The resulting 2-(4-substituted semicarbazido)- or 2-(4-substituted thiosemicarbazido)-1,4-benzodiazepine derivative (III) can be recovered in any desired purity by a per se conventional procedure (e.g., distillation of a solvent, recrystallization).

STEP 2

Subsequently, the compound (III) prepared in Step 1 is subjected to the cyclization reaction. Usually, the reaction will proceed smoothly on heating at about 120° to 250°C, accompanied with elimination of an alkyl-, aralkyl- or arylamine. The reaction may be carried out on heating the compound (III) to its melting point without presence of any solvent, or on heating it in a suitable solvent such as pyridine, collidine, dimethylformamide, xylene, tetralin and diphenyl ether, etc.

In the method of this invention, Step 1 and Step 2 may be carried out successively with or without isolation of compound (III). For instance, when the reaction between compounds (I) and (II) is carried out on heating in the presence of a solvent such as pyridine, collidine, the objective compound (IV) of this invention is obtainable at a single stroke.

In case the nitrogen at the 5-position is accompanied with oxygen, that is in the case of the 5N-oxide compounds, the oxygen may be removed, if desired, by reduction with a suitable deoxygenating agent such as phorphorus trihalide (e.g., phosphorus trichloride) or by catalytic hydrogenation. The compound (IV) prepared by the above mentioned manner can be recovered in a desired purity by a per se conventional procedure (e.g., recrystallization).

The compound (IV) has basic nitrogen atoms in its molecule, and therefore may be recovered in a form of a pharmaceutically acceptable acid salt (e.g., hydrochloride, sulfate, phosphate, oxalate, malonate, succinate, tartarate, citrate).

The 1-oxo- or 1-thioxo-s-triazolo[4,3-a][1,4] benzodiazepine derivatives of the formula (IV) may form a tautomer having the general formula

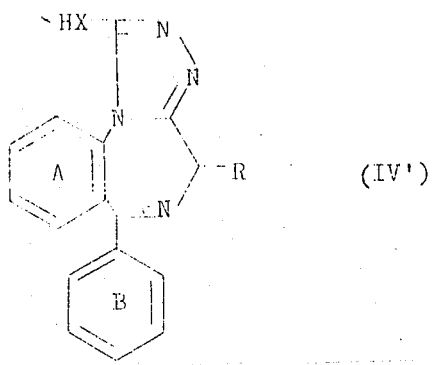

(IV')

wherein rings A and B, R and X have the same meaning as hereinbefore defined and the nitrogen at the 5-position is accompanied or unaccompanied with oxygen. These tautomers are also included in the objective compounds of this invention.

The compounds (III) and (IV) prepared by the method of this invention are novel and have remarkable pharmacological effects on central nervous system, such as muscular relaxing, anticonvulsive, sedative and sleep inducing effects, and are useful as medicaments, e.g., a muscular relaxing agent, an anticonvulsive agent, a tranquilizer and a sleep-inducing agent. The compounds (III) and (IV) and acid salts thereof are employed orally or parenterally as such or, if desired, mixed with pharmaceutically acceptable carrier, in a suitable pharmaceutical form such as powder, pellet, tablet and injection. The administration amount depends on type of the compound, conditions of illness and the like, and generally is from about 1 to 30 milligrams per day for an adult in oral administration.

This invention will be further illustrated by the following examples, wherein "part(s)" means "part(s) by weight" unless otherwise specified, and the relation between "part(s) by weight" and "part(s) by volume" corresponds to the relation between "gram(s)" and "milliliter(s)".

The starting material of this invention, 2-hydrazino-1,4-benzodiazepine derivative or 4N-oxide thereof can be easily prepared. For example, 7-chloro-2-hydrazino-5-phenyl-3H-1-4-benzodiazepine which is employed as the starting material in Examples 1,4 and 5 is prepared by the following manners described in References 1,2 and 3. The other starting materials can be prepared in a similar manner.

REFERENCE 1

To a suspension of 3.4 parts of 2-amino-7-chloro-5-phenyl-3H-1,4-benzodiazepine dihydrochloride in 60 parts (by volume) of methanol is added 1.25 part of 80 percent hydrazine hydrate and the mixture is stirred for 40 minutes. After addition of water, the mixture is extracted with methylene chloride. The methylene chloride layer is washed with water and dried over anhydrous sodium sulfate, followed by distillation of the solvent. Recrystallization of the residue from methylene chloride-benzene gives 7-chloro-2-hydrazino-5-phenyl-3H-1,4-benzodiazepine as colorless prisms. Melting point: about 170°C (browning), 202°–204°C (decomposition).

Elementary analysis:
  Calculated for $C_{15}H_{13}ClN_4$
    : C, 63.43; H, 4.48; N, 19.27
  Found : C, 63.27, H, 4.60; N, 19.68

REFERENCE 2

To a solution of 2 parts of 7-chloro-2-methylmercapto-5-phenyl-3H-1,4-benzodiazepine in 70 parts (by volume) of methanol are added 5 parts (by volume) of hydrazine hydrate and the mixture is kept standing for 3 days at a room temperature, followed by distillation of the solvent. The residue is diluted with water, whereupon 7-chloro-2-hydrazino-5-phenyl-3H-1,4-benzodiapine is obtained as crystals. Recrystallization from methylene chloride-benzene gives colorless prisms melting at 175°C (softening) and 205°–207°C (decomposition).

This product is identical with the compound obtained in Reference 1.

REFERENCE 3

A mixture of 2.9 parts of 7-chloro-1,3-dihydro-5-phenyl-2H-1,4-benzodiazepine-2-thione, 2.5 parts (by volume) of dimethyl sulfoxide, 100 parts (by volume) of ethanol, 5 parts (by volume) of 80 percent hydrazine hydrate is left standing for a day. After removal of ethanol by distillation under reduced pressure, the concentrate is diluted with water and extracted with methylene chloride. Methylene chloride layer is collected and dried over anhydrous sodium sulfate, followed by the removal of the solvent. Treatment of the residue with benzene gives 7-chloro-2-hydrazino-5-phenyl-3H-1,4- benzodiazepine as crystals. Recrystallization from methylene chloride-benzene gives colorless prisms melting at 205°–207°C (decomposition).

This product is identical with the product obtained in References 1 and 2.

EXAMPLE 1

To a solution of 14.2 parts of 7-chloro-2-hydrazino-5-phenyl-3H-1,4-benzodiazepine in 250 parts (by volume) of tetrahydrofuran are added 3.5 parts (by volume) of methyl isocyanate dropwise on ice-cooling and with stirring. After one hour stirring, the mixture is poured into 2000 parts (by volume) of water. The precipitate is collected by filtration, washed with water and acetone and then dried, whereupon 7-chloro-2-(4-methylsemicarbazido)-5-phenyl-3H-1,4-benzodiazepine is obtained as crystals. Recrystallization from dimethylformamide-water yields colorless needles, melting at 247°C (decomposition).

Elementary analysis
Calculated for $C_{17}H_{16}ClN_5O$
: C, 59.73; H, 4.72, N, 20.49
Found : C, 59.53, H, 4.62, N, 20.80

EXAMPLE 2

6.8 Parts of 7-chloro-2-(4-methylsemicarbazido)-5-phenyl-3H-1,4-benzodiazepine prepared in Example 1 is heated at 250°C with stirring, whereby the starting material melts with foaming. After heating about 15 minutes until the foaming subsides, the fused substance is treated with ethyl acetate, whereupon 8-chloro-6-phenyl-2,4-dihydro-1H-s-triazolo[4,3-a][1,4]benzodiazepin-1-one is obtained as crystals. Recrystallization from methanol gives colorless needles melting at 252°–253°C.

Elementary analysis
Calculated for $C_{16}H_{11}ClN_4O$
: C, 61.84; H, 3.57; N, 18.03
Found : C, 61.83, H, 3.47; N, 18.18

EXAMPLE 3

A mixture of 5.1 parts of 7-chloro-2-(4-methylsemicarbazido)-5-phenyl-3H-1,4-benzodiazepine prepared in Example 1 and 180 parts (by volume) of pyridine is refluxed for about 35 hours, until the generation of methylamine is hardly observed. The solvent is distilled off under reduced pressure and the residue is treated with ethyl acetate, whereupon 8-chloro-6-phenyl-2,4-dihydro-1H-s-triazolo [4,3-a][1,4]benzodiazepin-1-one is obtained as crystals. Recrystallization from methanol gives colorless needles melting at 252°–253°C.

This product is identical with the compound obtained in Example 2.

EXAMPLE 4

To a solution of 2.85 parts of 7-chloro-2-hydrazino-5-phenyl-3H-1,4-benzodiazepine in 120 parts (by volume) of pyridine is added 0.7 parts (by volume) of methyl isocyanate on ice-cooling and with stirring, and the mixture kept standing at room temperature for 30 minutes. After refluxing for 35 hours, the solvent is distilled off under reduced pressure. The residue is treated with ethyl acetate, whereupon 8-chloro-6-phenyl-2,4-dihydro-1H-s-triazolo-[4,3-a][1,4]benzodiazepin-1-one is obtained as crystals. Recrystallization from methanol yields colorless needles melting at 252°–253°C.

This product is identical with the compound obtained in Examples 2 and 3.

EXAMPLE 5

To a solution of 1.4 part of 7-chloro-2-hydrazino-5-phenyl-3H-1,4-benzodiazepine in 25 parts (by volume) of tetrahydrofuran is added 0.65 part (by volume) of phenyl isocyanate on ice-cooling and with stirring. After 1 hour stirring, twice an amount of water is added to the mixture. The resulting crystals are collected by filtration, washed with water and acetone, and dried, whereupon 7-chloro-5-phenyl-2-(4-phenylsemicarbazido)-3H-1,4-benzodiazepine is obtained as crystals. Recrystallization from dimethylformamide-water gives colorless fine needles, melting at 220°–221°C. (decomposition).

Elementary analysis:
Calculated for $C_{22}H_{18}ClN_5O$
: C, 65.42; H, 4.49, N, 17.34
Found : C, 65.61, H, 4.30, N, 17.28

EXAMPLE 6

A solution of 4 parts of 7-chloro-5-phenyl-2-(4-phenylsemicarbazido)-3H-1,4-benzodiazepine produced in Example 5 in 120 parts (by volume) of pyridine is refluxed for 5 hours. The solvent is distilled off under reduced pressure. The residue is treated with ethyl acetate, whereupon 8-chloro-6-phenyl-2,4-dihydro-1H-s-triazolo [4,3-a][1,4]benzodiazepin-1-one is obtained as crystals. Recrystallization from methanol gives colorless needles melting at 252°–253°C.

This product is identical with the compound obtained in Examples 2, 3 and 4.

EXAMPLE 7

To a solution of 3.1 parts of 7-chloro-2-hydrazino-5-(p-methoxyphenyl)-3H-1,4-benzodiazepine in 40 parts (by volume) of pyridine is added 0.7 part (by volume) of methyl isocyanate dropwise on ice-cooling and with stirring. After about 30 minutes' stirring, 100 parts (by volume) of water is added to the mixture. The resulting crystals are collected by filtration, washed with methanol, and dried, whereupon 7-chloro-5-(p-methoxyphenyl)-2-(4-methylsemicarbazido)-3H-1,4-benzodiazepine is obtained as crystals. Recrystallization from dimethylformamide-water gives colorless fine needles melting at 234°–235°C (decomposition).

Elementary analysis
Calculated for $C_{18}H_{18}ClN_5O_2$
: C, 58.14; H, 4.88; N, 18.84
Found : C, 57.83; H, 4.74; N, 19.17

EXAMPLE 8

A solution of 2.0 parts of 7-chloro-5-(p-methoxyphenyl)-2-(4-methylsemicarbazido)-3H-1,4- benzodiazepine prepared in Example 7 in 70 parts (by volume) of pyridine is refluxed for 36 hours. The solvent is distilled off under reduced pressure. The residue is treated with ethyl acetate, whereupon 8-chloro-6-(p-methoxyphenyl)-2,4-dihydro-1H-s-triazolo[4,3-a][1,4]benzodiazepin-1-one is obtained as crystals. Recrystallization from methanol gives colorless needles melting at 257°–258°C.

Elementary analysis
Calculated for $C_{17}H_{13}ClN_4O_2$
: C, 59.92; H, 3.82; N, 16.44
Found : C, 60.16; H, 3.77; N, 16.22

EXAMPLE 9

A mixture of 2.8 parts (by volume) of 2-amino-7-nitro-5-phenyl-3H-1,4-benzodiazepine and 2 parts (by volume) of hydrazine hydrate is stirred at room temperature for one hour, and is poured into ice water. Chloroform layer is washed with water and dried over anhydrous sodium sulfate. The solvent is distilled off to give 2-hydrazino-7-nitro-5-phenyl-3H-1,4-benzodiazepine as a viscous oily substance.

Thus produced 2-hydrazino derivative is dissolved in 20 parts (by volume) of pyridine, followed by an addition of 1.1 part (by volume) of methyl isocyanate on ice-cooling and with stirring. After one hour stirring, the mixture is admixed with 80 parts (by volume) of water. Thus produced precipitate is collected by filtration, washed with acetone and then dried, whereupon 2-(4-methylsemicarbazido)-7-nitro-5-phenyl-3H-1,4-benzodiazepine is obtained as crystals. Recrystallization from dimethylformamide-water gives yellow fine plates, melting at 239°–240°C (decomposition).

Elementary analysis
Calculated for $C_{17}H_{16}N_6O_3$
: C, 57.95; H, 4.58; N, 23.85
Found : C, 57.98; H, 4.47; N, 24.14

EXAMPLE 10

A solution of 4.2 parts of 2-(4-methylsemicarbazido)-7-nitro-5-phenyl-3H-1,4-benzodiazepine prepared in Example 9 in 150 parts (by volume) of pyridine is refluxed for 25 hours, followed by distillation of the solvent. The residue is admixed with water. The resulting precipitate is collected by filtration and dried, whereupon 8-nitro-6-phenyl-2,4-dihydro-1H-s-triazolo[4,3-a][1,4]benzodiazepin-1-one is obtained as crystals. Recrystallization from aqueous acetone gives yellow needles, melting at 199°–200°C.

Elementary analysis
Calculated for $C_{16}H_{11}N_5O_3$
: C, 59.81; H, 3.45; N, 21.80
Found : C, 60.00; H, 3.44; N, 21.77

EXAMPLE 11

To a solution of 3 parts of 7-chloro-2-hydrazino-5-phenyl-3H-1,4-benzodiazepine 4N-oxide in 60 parts (by volume) of pyridine is added 0.7 part (by volume) of methyl isocyanate on ice-cooling and with stirring. After about 30 minutes, the resulting crystals are collected by filtration, washed with methanol and dried, whereupon 7-chloro-2-(4-methylsemicarbazido)-6-phenyl-3H-1,4-benzodiazepine 4N-oxide is obtained as crystals. Recrystallization from dimethylformamide-water gives colorless fine needles, melting at 251°–252°C (decomposition).

Elementary analysis
Calculated for $C_{17}H_{16}ClN_5O_2$
: C, 57.06; H, 4.51; N, 19.58
Found : C, 56.86; H, 4.35; N, 19.81

EXAMPLE 12

A mixture of 3 parts of 7-chloro-2-(4-methylsemicarbazido)-6-phenyl-3H-1,4-benzodiazepine 4N-oxide prepared in Example 11, 60 parts (by volume) of pyridine and 140 parts (by volume) of dimethylformamide, is refluxed for 8.5 hours, followed by distillation of the solvent under reduced pressure. The residue is treated with aqueous ethanol, whereupon 8-chloro-6-phenyl-2,4-dihydro-1H-s-triazolo[4,3-a][1,4]benzodiazepin-1-one 5N-oxide is obtained as crystals. Recrystallization from methanol gives yellow prisms of monomethanolate, melting at 164°–166°C (foaming).

Elementary analysis
Calculated for $C_{16}H_{11}ClN_4O_2 \cdot CH_3OH$
: C, 56.91; H, 4.21; N, 15.62
Found : C, 56.77; H, 4.02; N, 15.88

Recrystallization from aqueous ethanol gives yellow prisms of the monohydrate, melting at 173°–174°C (softening).

Elementary analysis
Calculated for $C_{16}H_{11}ClN_4O_2 \cdot H_2O$
: C, 55.74; H, 3.80; N, 16.25
Found : C, 55.89; H, 3.85; N, 16.25

EXAMPLE 13

To a solution of 2.85 parts of 7-chloro-2-hydrazino-5-phenyl-3H-1,4-benzodiazepine in 25 parts (by volume) of pyridine is added 1.5 parts of phenyl isothiocyanate, and the mixture is refluxed. After 3.5 hours, pyridine is distilled off under reduced pressure. The residue is treated with ether, whereupon 8-chloro-6-phenyl-2,4-dihydro-1H-s-triazolo [4,3-a][1,4]benzodiazepine-1-thione is obtained as crystals. Recrystallization from methanol gives colorless prisms, melting at 237°–238°C.

Elementary analysis
Calculated for $C_{16}H_{11}ClN_4S$
: C, 58.79; H, 3.39; N, 17.14
Found : C, 58.94; H, 3.29, N, 17.24

EXAMPLE 14

To a solution of 2.85 parts of 7-chloro-2-hydrazino-5-phenyl-3H-1,4-benzodiazepine in 250 parts (by volume) of ethanol is added 1.5 parts of phenyl isothiocyanate, and the mixture is left standing at room temperature for about 3 hours. The precipitated crystals are collected by filtration, whereupon 7-chloro-5-phenyl-2-(4-phenylthiosemicarbazido)-3H-1,4-benzodiazepine is obtained as crystals. Recrystallization from acetone gives pale yellow needles, melting at 199°-205°C (decomposition).

Elementary analysis
Calculated for $C_{22}H_{18}ClN_5S$
: C, 62.96; H, 4.31; N, 16.67
Found : C, 62.51; H, 4.31; N, 16.65

EXAMPLE 15

A solution of 3 parts of 7-chloro-5-phenyl-2-(4-phenylthiosemicarbazido)-3H-1,4-benzodiazepine prepared in Example 14 in 25 parts (by volume) of pyridine is refluxed for 2 hours, followed by distillation of the solvent under reduced pressure. The residue is treated with ether. The resulting crystals are collected by filtration and dried, whereupon 8-chloro-6-phenyl-2,4-dihydro-1H-s-triazolo [4,3-a][1,4]benzodiazepine-1-thione is obtained as crystals. Recrystallization from methanol gives colorless prisms, melting at 237°-238°C.

This product is identical with the products obtained in Example 13.

EXAMPLE 16

To a solution of 3 parts of 7-chloro-2-hydrazino-5-phenyl-3H-1,4-benzodiazepine 4N-oxide in 20 parts (by volume) of pyridine is added 1.5 parts of phenyl isothiocyanate, and the mixture is refluxed for 2.5 hours. After cooling the mixture, the insoluble material is removed by filtration. The filtrate is concentrated to dryness under reduced pressure. Recrystallization of the residue from a mixture of ethanol and acetone gives 8-chloro-6-phenyl-2,4-dihydro-1H-s-triazolo[4,3-a][1,4]benzodiazepine-1-thione 5N-oxide as yellow prisms, melting at 243°-244°C (decomposition).

Elementary analysis
Calculated for $C_{16}H_{11}ClN_4OS \cdot \frac{1}{4}C_2H_5OH$
: C, 55.93; H, 3.56; N, 15.81
Found : C, 56.09; H, 3.74; N, 15.79

EXAMPLE 17

To a solution of 1.8 parts of 8-chloro-6-phenyl-2,4-dihydro-1H-s-triazolo[4,3-a][1,4]benzodiazepin-1-one 5N-oxide (methanolate) prepared in Example 12 in 200 parts (by volume) of chloroform are added 2.1 parts (by volume) of phosphorus trichloride, and the mixture is refluxed for 5 hours. After cooling the mixture, precipitated crystals are collected by filtration. Treatment of the crystals with diluted aqueous ammonia gives 8-chloro-6-phenyl-2,4-dihydro-1H-s-triazolo[4,3-a][1,4]benzodiazepin-1-one in a free form. Recrystallization from methanol gives colorless needles, melting at 252°-253°C.

This product is identical with the compound obtained in Examples 2, 3, 4 and 6.

EXAMPLE 18

A mixture of 1.77 parts of 7-chloro-6-phenyl-2,4-dihydro-1H-s-triazolo-[4,3-a][1,4]benzodiazepine-1-thione 5N-oxide (¼ ethanolate) prepared in Example 16, 2.1 parts (by volume) of phosphorus trichloride and 200 parts (by volume) of chloroform is refluxed for 4 hours, followed by concentration of the mixture. The residue is neutralized with diluted aqueous ammonia and extracted with chloroform. The chloroform layer is washed with water, dried over anhydrous sodium sulfate and concentrated. The residue is treated with ethyl ether, whereupon 8-chloro-6-phenyl-2,4-dihydro-1H-s-triazolo[4,3-a][1,4]-benzodiazepine-1-thione is obtained as crystals. Recrystallization from methanol gives colorless needles, melting at 234°-236°C.

This product is identical with the compound obtained in Examples 13 and 15.

What is claimed is:

1. A member selected from the group consisting of a compound of the formula

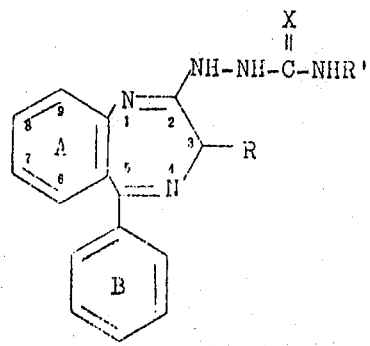

wherein rings A and B independently are unsubstituted or substituted by a member selected from the group consisting of halogen, nitro, trifluoromethyl, alkyl and alkoxy, R is hydrogen or lower alkyl, X is oxygen or sulfur and R' is a member selected from the group consisting of alkyl of 1-8 carbon atoms, cycloalkyl of 3-8 carbon atoms, phenyl, naphthyl and phenyl lower alkyl, a 4N-oxide thereof and a pharmaceutically acceptable salt thereof.

2. A compound according to claim 1, namely, 7-chloro-2-(4-methylsemicarbazido)-5-phenyl-3H-1,4-benzodiazepine.

3. A compound according to claim 1, namely, 7-chloro-2-(4-phenylsemicarbazido)-5-phenyl-3H-1,4-benzodiazepine.

4. A compound according to claim 1, namely, 7-chloro-5-(p-methoxyphenyl)-2-(4-methylsemicarbazido)-3H-1,4-benzodiazepine.

5. A compound according to claim 1, namely, 2-(4-methylsemicarbazido)-7-nitro-5-phenyl-3H-1,4-benzediazepine.

6. A compound according to claim 1, namely, 7-chloro-2-(4-methylsemicarbazido)-5-phenyl-3H-1,4-benzodiazepine 4N-oxide.

7. A compound according to claim 1, namely, 7-chloro-2-(4-phenylthiosemicarbazido)-5-phenyl-3H-1,4-benzodiazepine.

* * * * *